US012456854B2

United States Patent
Ruayana et al.

(10) Patent No.: US 12,456,854 B2
(45) Date of Patent: Oct. 28, 2025

(54) CABLE RETAINER AND METHOD

(71) Applicant: Lear Corporation, Southfield, MI (US)

(72) Inventors: Jun Ruayana, Novi, MI (US); Muhammad Ashrafi, Woodhaven, MI (US); Vinodh Krishnan Balasubramanian, Sterling Heights, MI (US); John Montgomery, Canton, MI (US); William Bond, Livonia, MI (US); Erwin Baga-an, Cebu (PH)

(73) Assignee: Lear Corporation, Southfield, MI (US)

( * ) Notice: Subject to any disclaimer, the term of this patent is extended or adjusted under 35 U.S.C. 154(b) by 283 days.

(21) Appl. No.: 18/227,735

(22) Filed: Jul. 28, 2023

(65) Prior Publication Data
US 2025/0038508 A1    Jan. 30, 2025

(51) Int. Cl.
*H02G 3/32* (2006.01)
*H01R 13/42* (2006.01)

(52) U.S. Cl.
CPC .............. *H02G 3/32* (2013.01); *H01R 13/42* (2013.01)

(58) Field of Classification Search
CPC ........ H02G 3/02; H02G 3/32; B60R 16/0215; H01R 13/42
USPC ...................................................... 174/650
See application file for complete search history.

(56) References Cited

U.S. PATENT DOCUMENTS

| 4,700,913 | A | * | 10/1987 | Hirano | F16L 3/23 |
| | | | | | 24/543 |
| 4,918,261 | A | | 4/1990 | Takahashi et al. | |
| 5,932,846 | A | | 8/1999 | Zaguskin | |
| 6,561,465 | B2 | | 5/2003 | Kondo | |
| 7,301,101 | B2 | | 11/2007 | Suzuki | |
| 10,960,831 | B2 | | 3/2021 | Nishimura | |
| 11,059,434 | B2 | | 7/2021 | Iwahara | |
| 2009/0266945 | A1 | * | 10/2009 | Dietrich | F16L 3/1211 |
| | | | | | 248/74.2 |
| 2012/0217355 | A1 | * | 8/2012 | Geiger | F16L 3/2332 |
| | | | | | 248/65 |

(Continued)

FOREIGN PATENT DOCUMENTS

| JP | 2004104964 A | 4/2004 |
| KR | 20090109308 A | 10/2009 |

(Continued)

*Primary Examiner* — Timothy J Thompson
*Assistant Examiner* — Michael F Mcallister
(74) *Attorney, Agent, or Firm* — Fishman Stewart PLLC

(57) ABSTRACT

A cable retainer may include a base and a retention member. The base may include a platform, a fastener, a securing protrusion, and a securing protrusion opening disposed in the securing protrusion. The fastener may extend from the platform and may be engageable with a second object. The securing protrusion may extend from the platform and may be disposable through a portion of a flat cable. The retention member may include a wall and a retention member opening. The securing protrusion may be connectable to the wall to secure said flat cable between the platform and the retention member. When in an assembled configuration, the securing protrusion opening and the retention member opening may be at least partially aligned with one another and define a common passage to receive a connector to connect a first object to the base and the retention member.

20 Claims, 13 Drawing Sheets

(56) References Cited

U.S. PATENT DOCUMENTS

| | | | |
|---|---|---|---|
| 2015/0226354 A1* | 8/2015 | Reed | F16L 3/1058 248/67.5 |
| 2023/0369839 A1 | 11/2023 | Ruayana | |
| 2023/0369840 A1 | 11/2023 | Racho | |

FOREIGN PATENT DOCUMENTS

| | | |
|---|---|---|
| KR | 102408509 B1 | 6/2022 |
| WO | 2015122277 A1 | 8/2015 |

* cited by examiner

CABLE RETAINER AND METHOD

TECHNICAL FIELD

The present disclosure generally relates to cable retainers for connecting one or more objects together, such as cable retainers that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Figure 1:
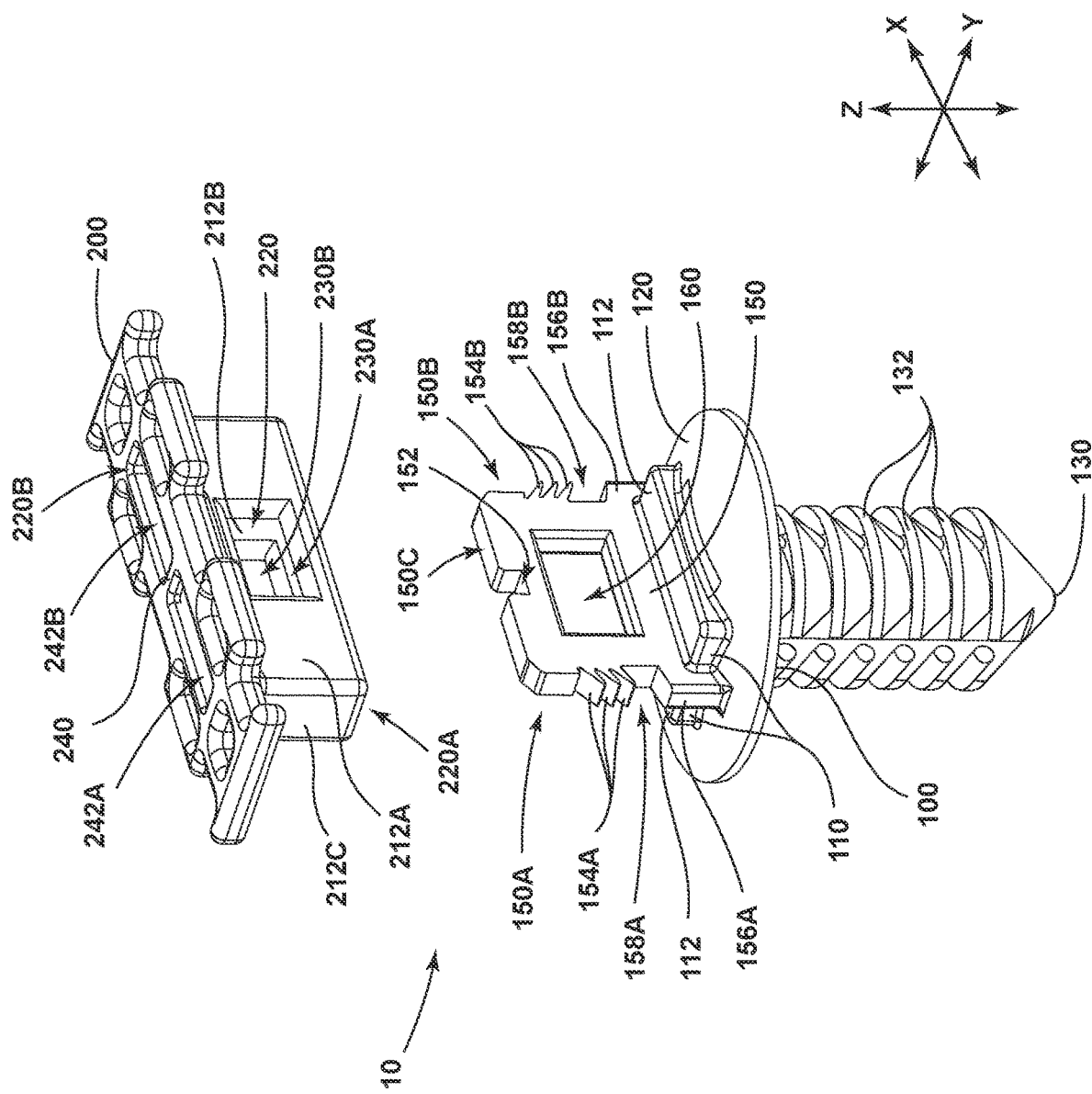
FIGS. 1 and 2 are exploded perspective views generally illustrating an embodiment of a cable retainer according to teachings of the present disclosure.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Referring to FIGS. 1-4, a cable retainer 10 for connecting a plurality of objects to one another is depicted. As generally illustrated in FIGS. 5-9E, the cable retainer 10 may be used to connect a flat cable 20 (e.g., a flat flexible cable), a first object 30 (e.g., a wire and/or a round wire bundle), and/or a second object 40 (e.g., a bracket, a mount, a panel, a surface, an external object, and/or another element or component of a vehicle) to one another. For example and without limitation, the cable retainer 10 may be used to connect and/or mount a flat cable 20 and/or a first object 30 to a second object 40.

The cable retainer 10 includes a base 100 and a retention member 200. The base 100 and the retention member 200 are formed separately (e.g., as independent components) from one another. For example, the base 100 and the retention member 200 are each single, unitary, monolithic components that are formed separately from each other. In other embodiments, the base 100 and the retention member 200 are connected to one another (e.g., via a flexible strap, tether, and/or an integral extension) and/or formed together as a single monolithic component. The cable retainer 10, the base 100, and the retention member 200 are composed of one or more plastic materials. However, the cable retainer 10, the base 100, the retention member 200, and/or one or more portions thereof are composed of other suitable materials, such as a metal and/or a metal alloy, in other embodiments.

The base 100 and the retention member 200 are connectable to one another to, for example, connect and/or lock the cable retainer 10 to the flat cable 20. The cable retainer 10 is in an assembled configuration (see, e.g., FIGS. 3-8 and 9C-9E) when the retention member 200 is connected to the base 100 (e.g., when the securing protrusion 150 is connected to one or more walls 212A-212D and/or when the retention member 200 is disposed on the base 100 with the securing protrusion 150 disposed in the receptacle 220 and engaged with the internal connection formation 250). The cable retainer 10 is in an unassembled confirmation (see, e.g., FIGS. 1, 2, 9A, and 9B) when the retention member 200 is not disposed on and/or connected to the base 100 (e.g., when the securing protrusion 150 is not connected to one or more walls 212A-212D and/or when the securing protrusion 150 is not disposed in the receptacle 220 of the retention member 200). The cable retainer 10 is connectable to the flat cable 20, the first object 30, and/or the second object 40 when in the assembled configuration and when in the unassembled configuration.

As generally illustrated in FIGS. 1-4, the base 100 includes a platform 110, a flange 120, a fastener 130, and a securing protrusion 150. The base 100 is connectable to the retention member 200, the flat cable 20, and the first object 30 via the securing protrusion 150. The base 100 is also connectable to the second object 40 via the fastener 130. The base 100 and the portions thereof (e.g., the platform 110, the flange 120, the fastener 130, and the securing protrusion 150) are formed as a single, unitary, monolithic component that is separate from the retention member 200.

As generally illustrated in FIGS. 1-4, the flange 120 has a hollow, conical configuration. The platform 110 is disposed at and extends from a first, narrower end 120A of the flange 120 generally in the Z-direction (e.g., a first direction). In other embodiments, the platform 110 does not extend from the flange 120 and/or is defined by a portion of the flange 120. The platform 110 has a support surface 112 that faces away from the flange 120 (e.g., generally in the Z-direction) and supports at least a portion of the flat cable 20 when the flat cable 20 is connected to the cable retainer 10. The securing protrusion 150 is disposed partially on the platform 110 (e.g., on the support surface 112) and partially on the flange 120, and extends therefrom generally in the Z-direction (e.g., the first direction). The fastener 130 is disposed on an opposite side of the platform 110 and/or the flange 120 relative to the securing protrusion 150 and extends therefrom in an opposite direction than the securing protrusion 150 (e.g., generally in the Z-direction). The fastener 130 is at least partially encircled by the flange 120 (e.g., the flange 120 extends around the fastener 130) and projects from a second, wider end 120B of the flange 120. In other embodiments, the securing protrusion 150 and the fastener 130 extend in the same direction, extend obliquely relative to one another, or extend perpendicularly relative to one another.

As generally illustrated in FIGS. 1-4, the fastener 130 is configured to engage the second object 40 (e.g., a recess 42 thereof) to connect the base 100 and/or the cable retainer 10 and the second object 40. The fastener 130 includes one or more engagement projections 132 that engage the second object 40 to connect the cable retainer 10 and/or the base 100 to the second object 40. The engagement projections 132 have a generally hollow, conical shape and are outwardly angled, sloped, and/or curved toward the platform 110 (e.g., the engagement projections 132 each have a wider end that opens toward the platform 110). The engagement projections 132 are disposed spaced apart from one another along the length of the fastener 130 (e.g., generally in the Z-direction). In other embodiments, the engagement projections 132 contact one another and/or are structured in a stepped and/or sawtooth-like manner.

As generally illustrated in FIGS. 1-4, the securing protrusion 150 is structured as a generally planar body, but may have other suitable configurations in other embodiments. The securing protrusion 150 includes a notch 152, at least one projection 154A, 154B, at least one shoulder 156A, 156B, and a securing protrusion opening 160. The securing protrusion 150 is disposable through a portion of the flat cable 20 (e.g., the recess 22), which connects the base 100 and the flat cable 20 together in at least some embodiments.

As generally illustrated in FIGS. 1-4, the notch 152 is disposed in a free end 150C of the securing protrusion 150 (e.g., an end of the securing protrusion 150 opposite the platform 110 and/or the flange 120). The notch 152 projects into the securing protrusion 150 generally in the Z-direction (e.g., generally toward the platform 110) and extends longitudinally generally in the Y-direction. The notch 152 is structured in a complimentary manner to a positioning body 240 of the retention member 200. The notch 152 receives the positioning body 240 in the assembled configuration to restrict and/or limit relative movement between the base 100 and the retention member 200 (e.g., movement in the X-direction and/or rotational/tilting movement in an X-Z plane), such as movement of the securing protrusion 150 within the receptacle 220 and/or relative to one or more walls 212A-212D.

Figure 2:
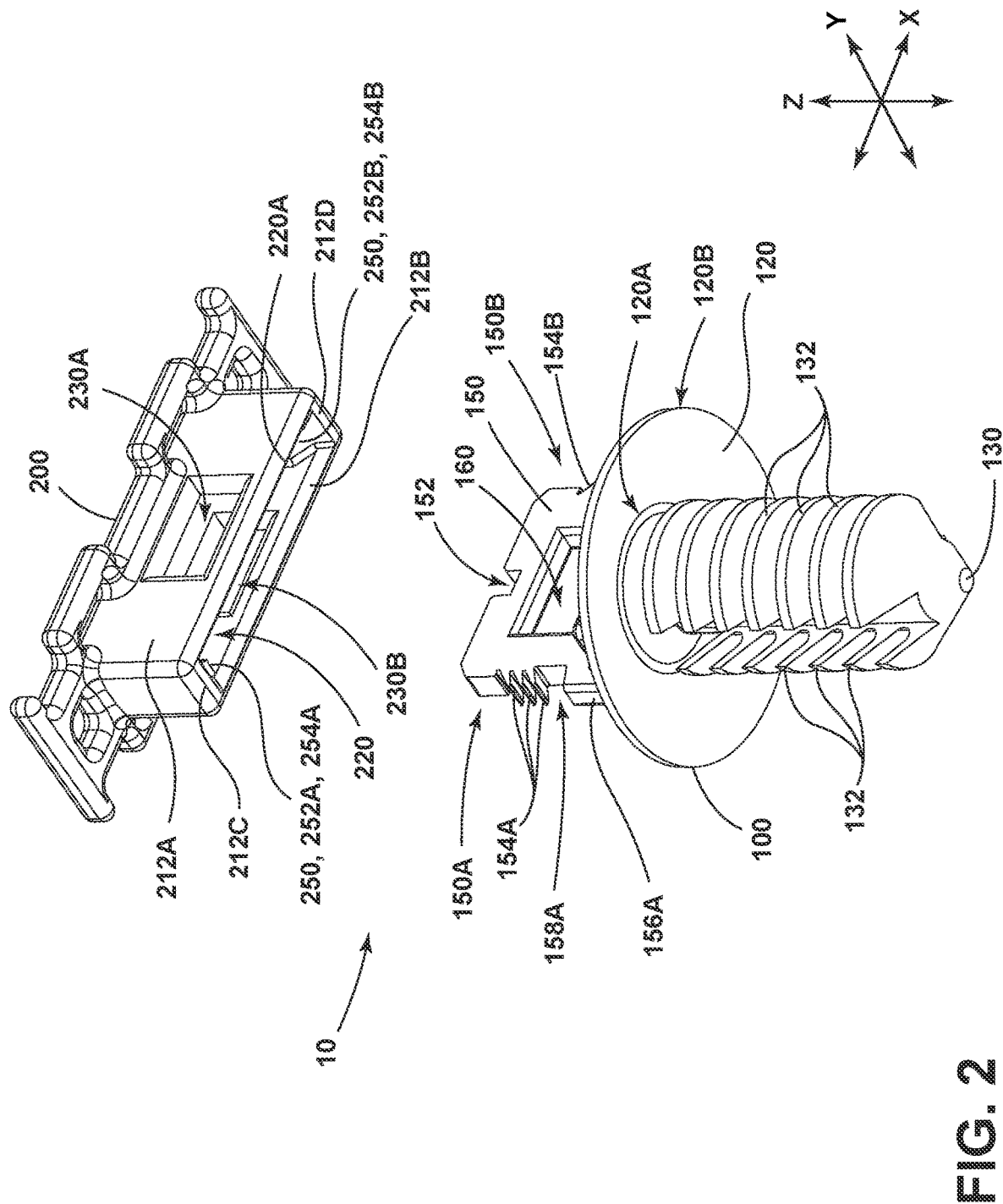
Figure 4:
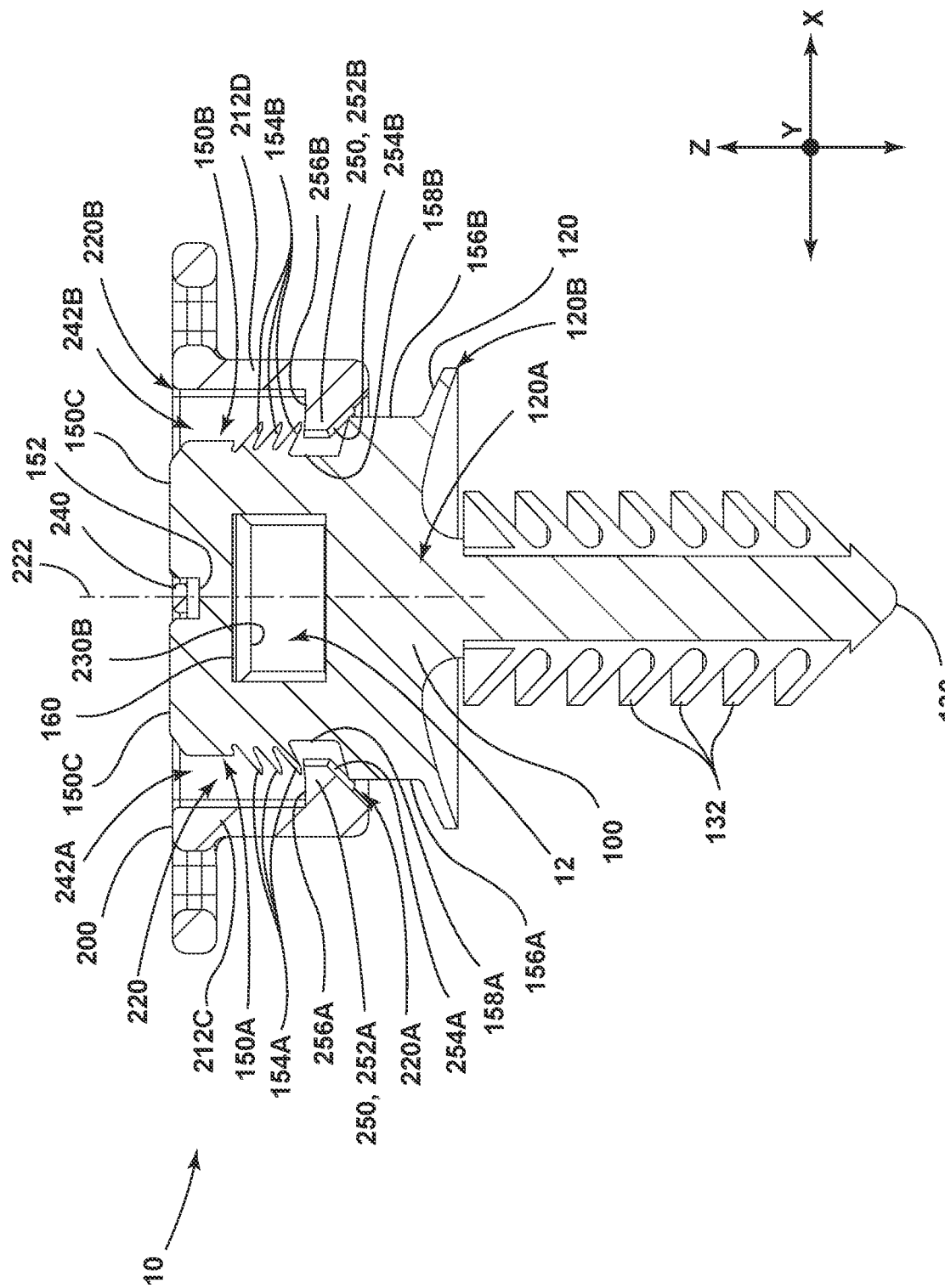
FIG. 4 is a cross-sectional view generally illustrating an embodiment of a cable retainer according to teachings of the present disclosure.
Figure 5:
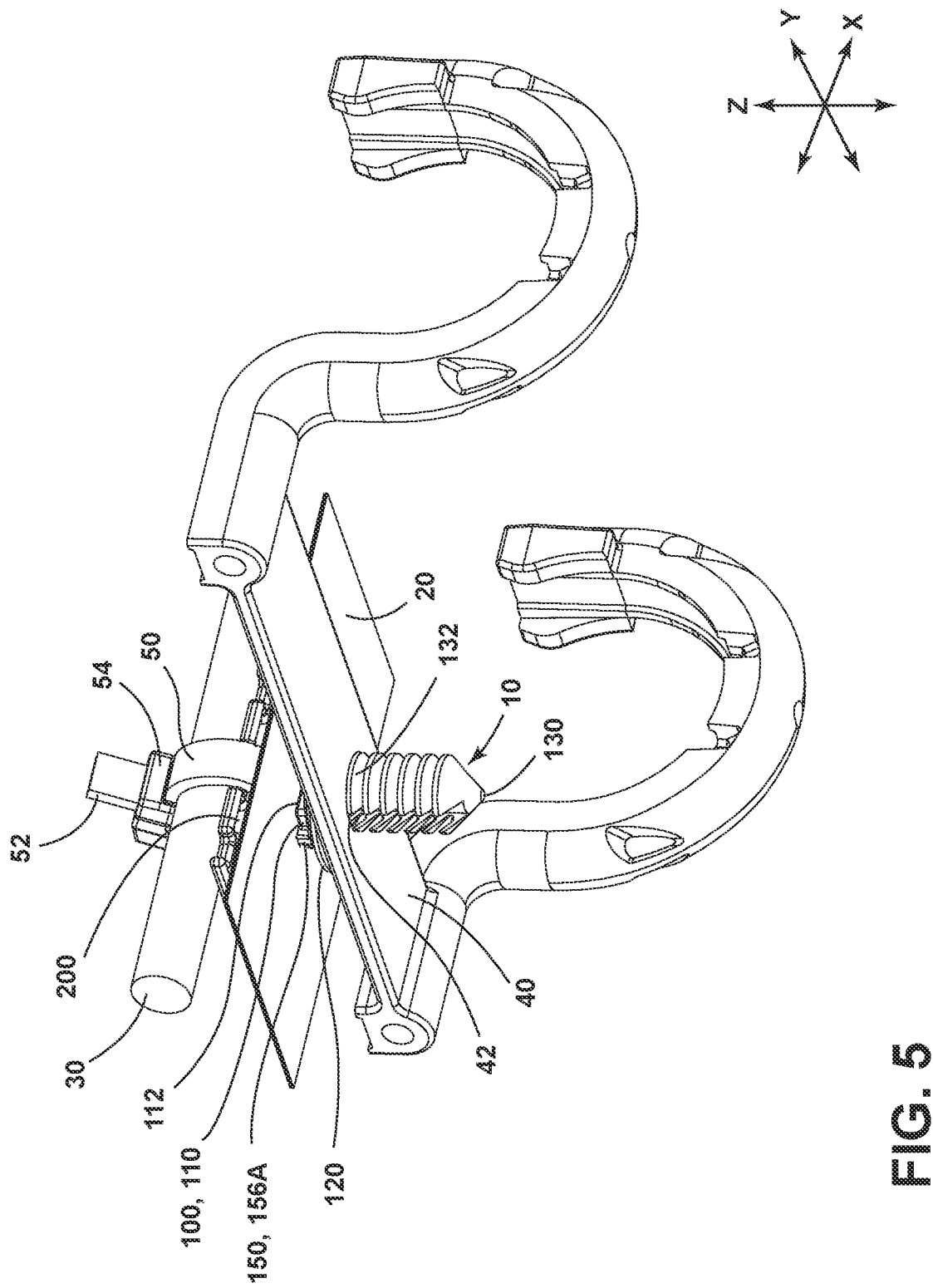
FIGS. 5 and 6 are perspective views generally illustrating an embodiment of a cable retainer connected to a flat flexible cable, a first object, and a second object according to teachings of the present disclosure.
Figure 6:
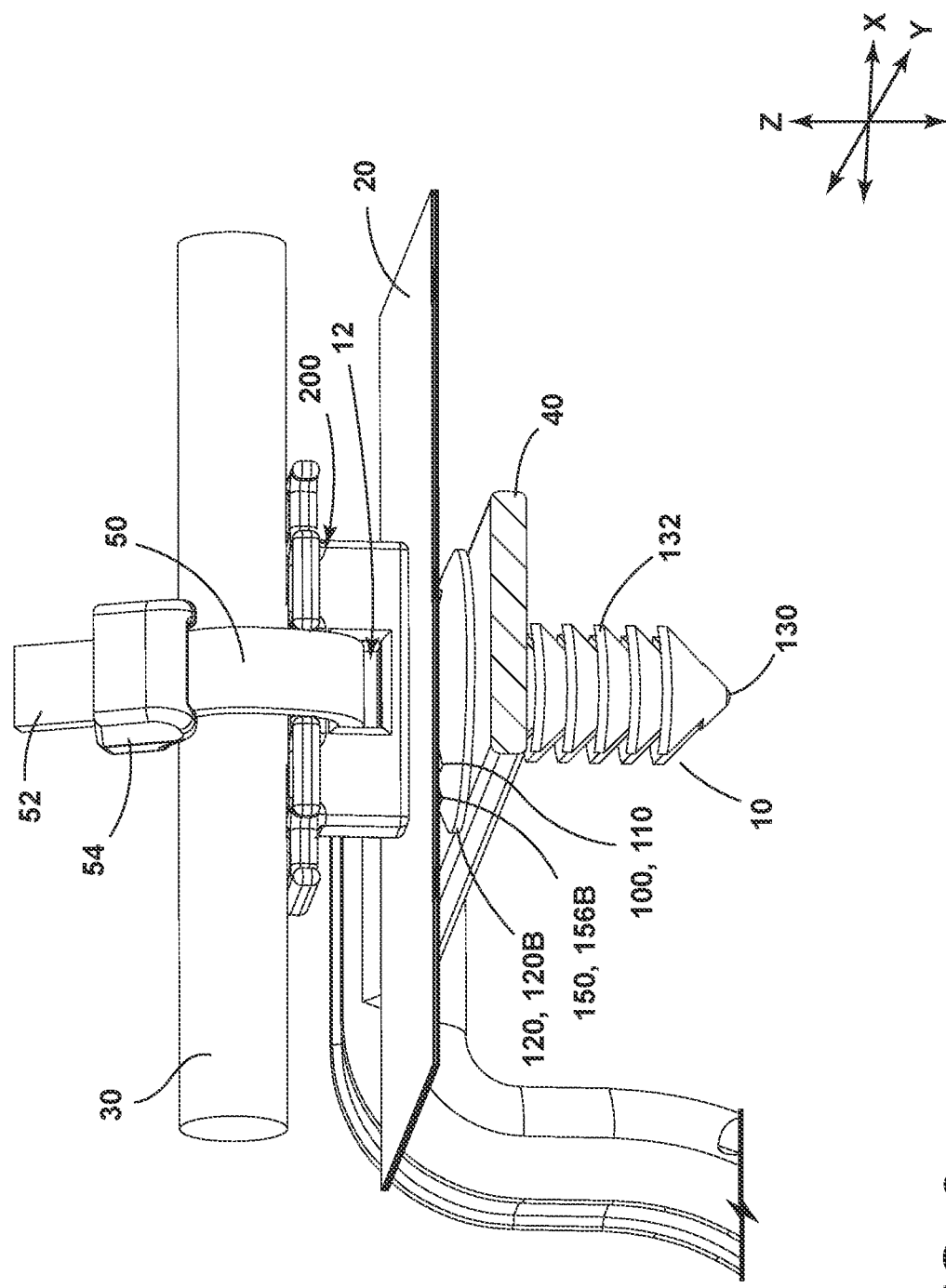
Figure 7:
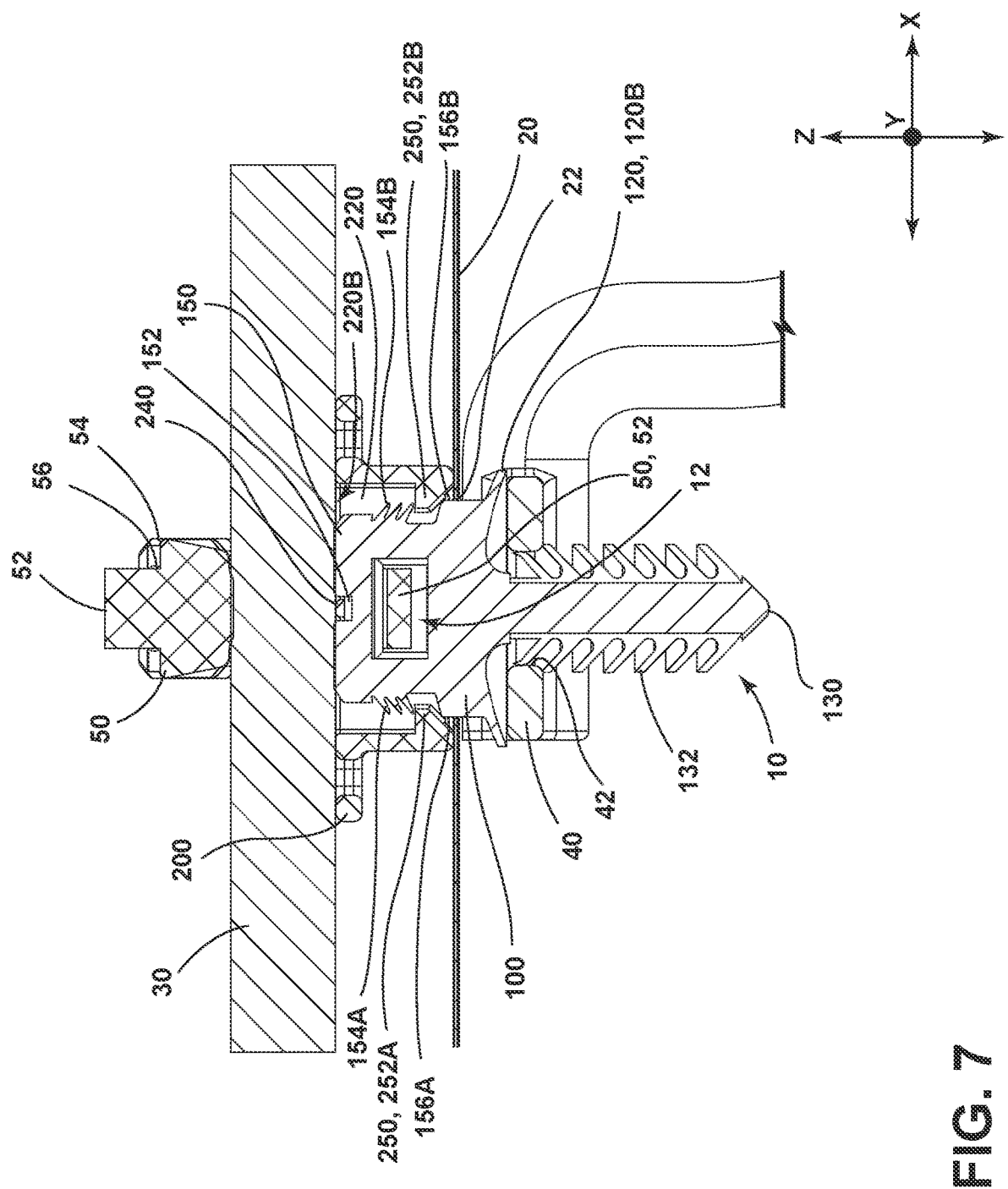
FIGS. 7 and 8 are cross-sectional views generally illustrating an embodiment of a cable retainer connected to a flat cable, a first object, and a second object according to teachings of the present disclosure.
Figure 8:
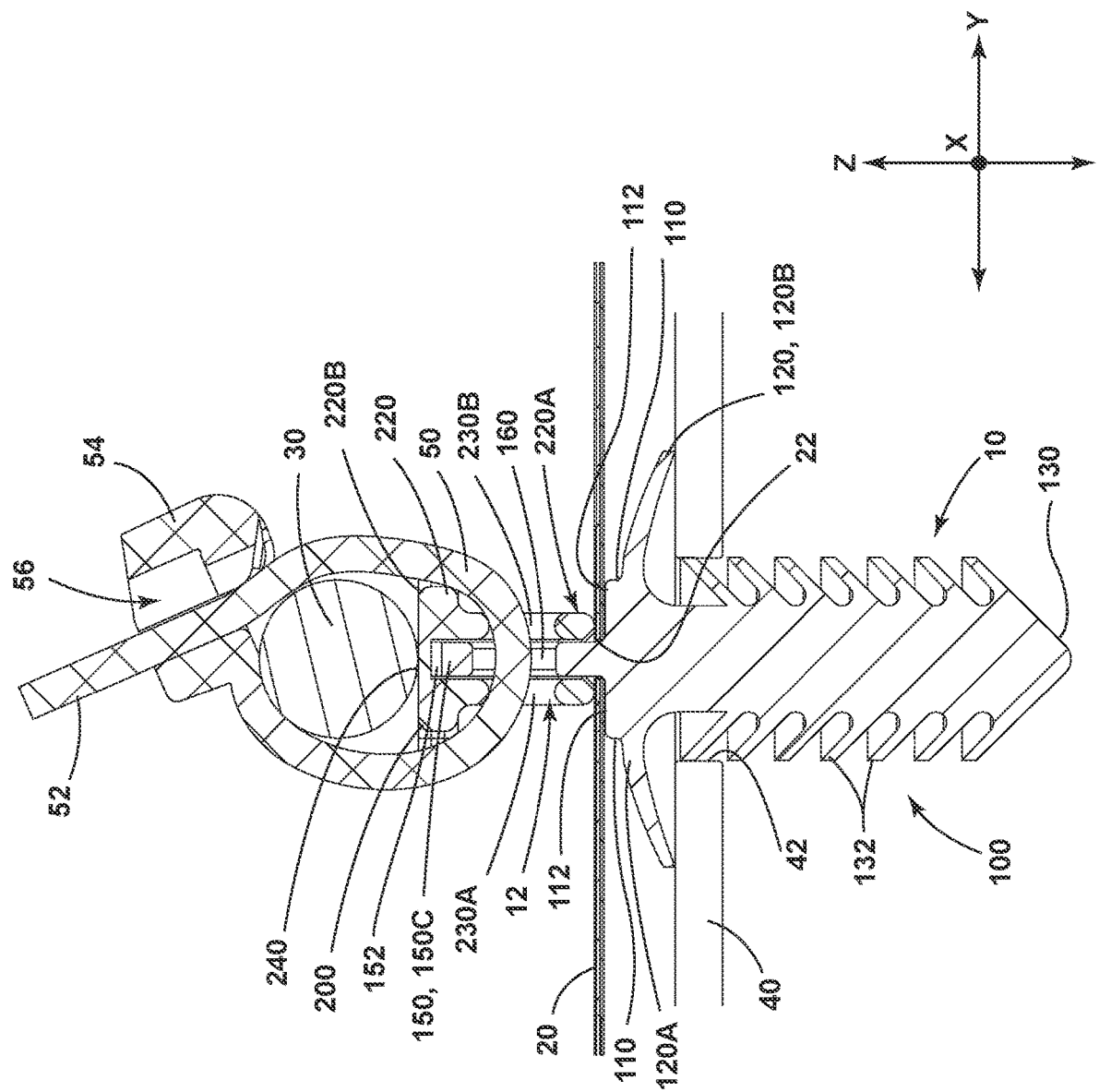

As generally illustrated in FIGS. 1, 2, and 4, the securing protrusion 150 includes at least one first projection 154A and at least one second projection 154B that engage the retention member 200 (e.g., the internal connection formation 250) to connect the base 100 and the retention member 200 to one another and/or to resist removal of the securing protrusion 150 from the receptacle 220 of the retention member 200. The first projections 154A and the second projections 154B are disposed on opposite sides of the securing protrusion 150 and project from the securing protrusion 150 away from the securing protrusion opening 160 (e.g., generally in the X-direction, and/or a third direction). When in the assembled configuration, one or more of the first projections 154A engage (e.g., contact and/or abut) the internal connection formation 250 (e.g., a first latching nose 252A) of the retention member 200 and one or more of the second projections 154B engage (e.g., contact and/or abut) the internal connection formation 250 (e.g., a second latching nose 252B) of the retention member 200. The projections 154A, 154B may flex in at least one direction (e.g., generally in a Z-direction) when contacted by the internal connection formation 250 so as not to materially restrict insertion of the securing protrusion 150 into the receptacle 220, but are sufficiently rigid to restrict and/or prevent removal of the securing protrusion 150 from the receptacle 220 in the opposite direction (e.g., in the opposite Z-direction) when engaged with the internal connection formation 250. In some embodiments, the securing protrusion 150 only includes a single set of projections 154A. 154B (e.g., only includes first projections 154A or only includes second projections 154B).

As generally illustrated in FIGS. 1, 2, and 4, the projections 154A, 154B have a substantially polygonal (e.g., rectangular) shape and are outwardly angled, sloped, and/or curved toward the platform 110. The first projections 154A are disposed spaced apart from one another along a first side 150A of the securing protrusion 150. The second projections 154B are disposed spaced apart from one another along a second side 150B of the securing protrusion 150. In other embodiments, the projections 154A, 154B contact one another and/or are structured in a stepped and/or sawtooth-like manner (e.g., as serrations).

As generally illustrated in FIGS. 1-4, the securing protrusion 150 includes a first shoulder 156A and a second shoulder 156B. The shoulders 156A, 156B are each disposed at least partially on and/or above the platform 110 and the flange 120 (e.g., between the projections 154A, 154B and the platform 110). The first shoulder 156A and the second shoulder 156B are disposed on opposite sides of the securing protrusion 150 and project away from one another (e.g., generally in the X-direction). The first shoulder 156A is disposed spaced apart from the first projections 154A (e.g., generally in the Z-direction) on the first side 150A of the securing protrusion 150 such that a first space 158A is defined therebetween. The second shoulder 156B is disposed spaced apart from the second projections 154B (e.g., generally in the Z-direction) on the second side 150B of the securing protrusion 150 such that a second space 158B is defined therebetween. When in the assembled configuration, the shoulders 156A, 156B may be at least partially disposed in the receptacle 220 of the retention member 200 (e.g., between the sloped surfaces 254A, 254B of the latching noses 252A, 252B), which may limit and/or restrict relative movement between the base 100 and the retention member 200 to, for example, reduce and/or prevent noise generation (e.g., rattling).

As generally illustrated in FIGS. 1-4, the securing protrusion 150 includes and/or defines a securing protrusion opening 160 that receives at least a portion of a connector 50 (e.g., a tie strap). The base 100 engages the connector 50 via the securing protrusion opening 160 to, for example, connect the cable retainer 10, the base 100, the retention member 200, the flat cable 20, and/or the second object 40 to the first object 30. The securing protrusion opening 160 is disposed in the securing protrusion 150 at least partially between the first projections 154A and the second projections 154B (e.g., relative to the X-direction). The securing protrusion opening 160 extends completely through the securing protrusion 150 generally in a Y-direction (e.g., in a second direction). The securing protrusion opening 160 is generally rectangular and is generally larger than the retention member openings 230A. 230B of the retention member 200, but has other shapes and sizes in other embodiments.

As generally illustrated in FIGS. 1-4, the retention member 200 is structured in the manner of a cap and/or a cover that connects to the securing protrusion 150 of the base 100.

The retention member 200 includes at least one wall 212A-212D, a receptacle 220, at least one retention member opening 230A, 230B, a positioning body 240, at least one slot 242A, 242B, and an internal connection formation 250. The retention member 200 and the portions thereof (e.g., the walls 212A-212D, the positioning body 240, and the internal connection formation 250) are formed as a single, unitary, monolithic component that is separate from the base 100.

As generally illustrated in FIGS. 1-4, the retention member 200 includes one or more walls 212A-212D to which the securing protrusion 150 is connectable. In at least some examples, one or more of the walls 212A-212D may be configured as an extension, protrusion, projection, flange, or other suitable body or structure. In the illustrated example, the walls 212A-212D define a receptacle 220 that receives the securing protrusion 150 to connect the retention member 200 to the base 100. The receptacle 220 has a central longitudinal axis 222 that extends generally in the Z-direction. The receptacle 220 has a first end 220A and a second end 220B that are disposed opposite one another in the Z-direction. The securing protrusion 150 is insertable into the receptacle 220 via the first end 220A of the receptacle 220, which is open. The second end 220B of the receptacle 220 is at least partially closed by the positioning body 240. The receptacle 220 and/or the open, first end 220A thereof has a shape that generally corresponds to the securing protrusion 150 and, in some examples, may be slightly larger than the securing protrusion 150 in one or more dimensions (e.g., in the X-direction). In the illustrative example, the receptacle 220 is defined by four generally planar walls 212A-212D of the retention member 200 and has a generally rectangular cross-section. In other embodiments, the receptacle 220 is defined by a singular (e.g., cylindrical) wall or another suitable number of walls defining a desired shape.

As generally illustrated in FIGS. 1-4, the retention member 200 includes and/or defines at least one retention member opening (e.g., a first retention member opening 230A and a second retention member opening 230B) that receive a portion of the connector 50 (e.g., a tie strap). The retention member 200 engages the connector 50 via the retention member openings 230A, 230B to, for example, connect the cable retainer 10, the base 100, the retention member 200, the flat cable 20, and/or the second object 40 to the first object 30. The retention member openings 230A. 230B are disposed on opposite sides of the retention member 200 and/or the axis 222 of the receptacle 220. The retention member openings 230A, 230B are disposed in and defined by opposing walls 212A, 212B of the retention member 200. The retention member openings 230A. 230B extend completely through the respective wall 212A, 212B of the retention member 200 generally in the Y-direction. The retention member openings 230A, 230B are at least partially aligned with one another in the Y-direction and, when in the assembled configuration, at least partially aligned with the securing protrusion opening 160 of the securing protrusion 150 in the Y-direction to form and/or define a common passage 12 of the cable retainer 10.

Figure 3:
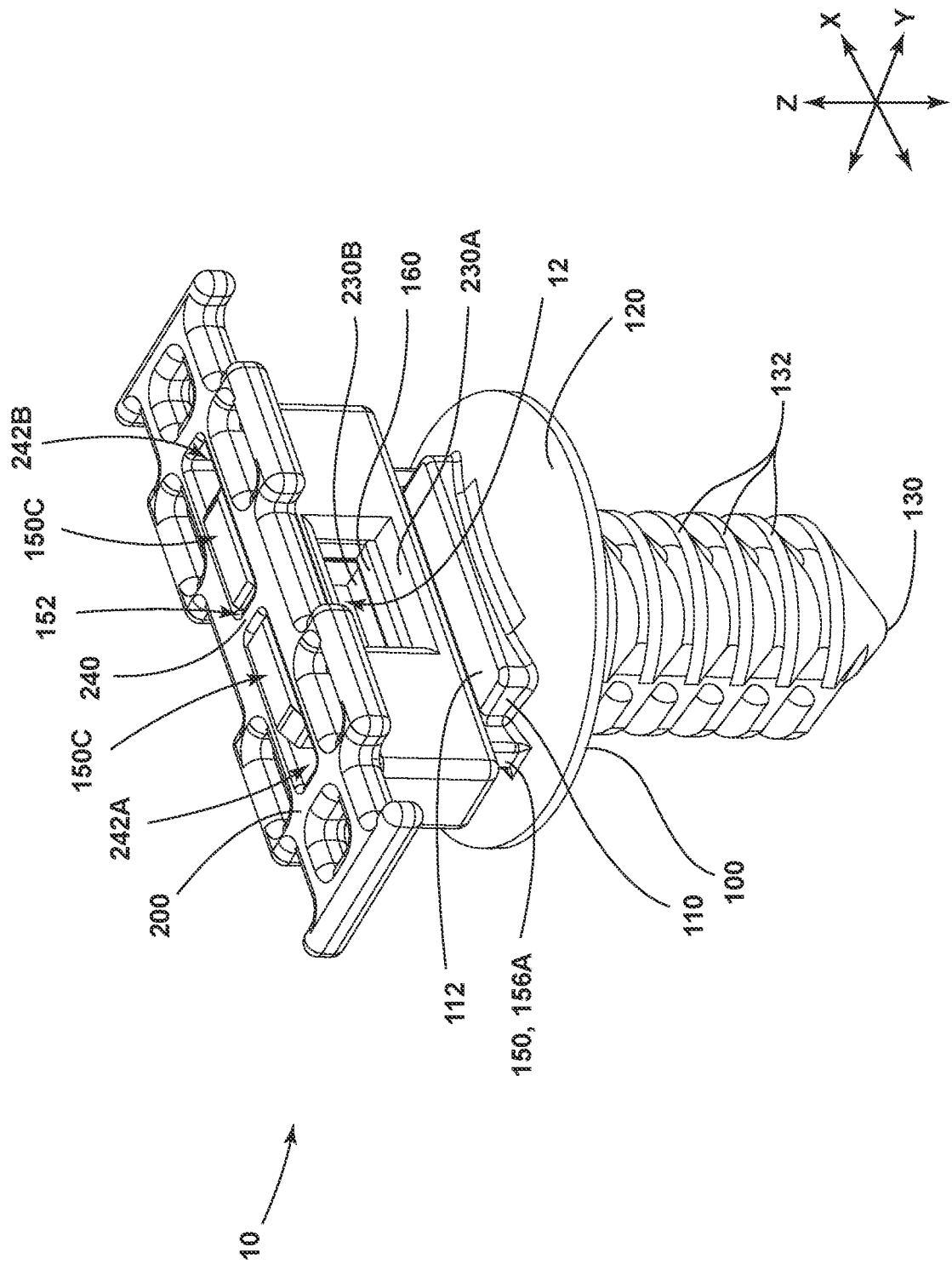
FIG. 3 is a perspective view generally illustrating an embodiment of a cable retainer according to teachings of the present disclosure.

As generally illustrated in FIGS. 1, 3, and 4, the retention member 200 includes a positioning body 240 and one or more slots (e.g., a first slot 242A and a second slot 242B). The positioning body 240 extends across the second end 220B of the receptacle 220 in the Y-direction (e.g., between opposing walls 212A, 212B of the retention member 200) and divides the second end 220B of the receptacle 220 to form the first slot 242A and the second slot 242B. The positioning body 240 is structured in a complimentary manner to the notch 152 of the securing protrusion 150. The positioning body 240 is received in the notch 152, and the securing protrusion 150 is at least partially disposed in the slots 242A, 242B in the assembled configuration to restrict and/or limit relative movement between the base 100 and the retention member 200 (e.g., movement in the X-direction and/or rotational/tilting movement in an X-Z plane), such as movement of the securing protrusion 150 within the receptacle 220 and/or relative to one or more walls 212A-212D.

As generally illustrated in FIGS. 2 and 4, the retention member 200 includes an internal connection formation 250 that engages the securing protrusion 150 (e.g., via the projections 154A, 154B and/or the shoulders 156A, 156B) to restrict and/or prevent removal of the securing protrusion 150 from the receptacle 220 (e.g., disconnection of the retention member 200 and the base 100, and/or disconnection of the flat cable 20 and the cable retainer 10). The internal connection formation 250 is disposed within the receptacle 220 at or about the first end 220A. In some embodiments, the internal connection formation 250 is structured as a plurality of latching noses (e.g., a first latching nose 252A and a second latching nose 252B). In other embodiments, the internal connection formation 250 is structured as a ridge, a rim, or a lip, among other formations and/or extends completely around the first end 220A of the receptacle 220.

The latching noses 252A, 252B are disposed on opposite sides of the retention member 200 and/or the axis 222 of the receptacle 220. The latching noses 252A, 252B project into the receptacle 220 toward one another (e.g., generally in an X-direction) from opposing walls 212C, 212D of the retention member 200. The latching noses 252A, 252B each have a sloped surface 254A, 254B and an engagement surface 256A, 256B. The engagement surface 256A, 256B generally faces toward the second end 220B of the receptacle 220, the positioning body 240, and/or the slots 242A, 242B. The engagement surface 256A, 256B may contact and/or abut one or more of the corresponding projections 154A, 154B when in the assembled configuration. The sloped surface 254A, 254B generally faces toward the first end 220A of the receptacle 220 and are sloped inwardly toward the axis 222 of the receptacle 220. The sloped surfaces 254A, 254B of the latching noses 252A, 252B facilitate and guide insertion of the securing protrusion 150 into the receptacle 220. When in the assembled configuration, (i) the first latching nose 252A is disposed in the first space 158A defined between the first projections 154A and the first shoulder 156A, and (ii) the second latching nose 252B is disposed in the second space 158B between the second projections 154B and the second shoulder 156B. Each latching nose 252A, 252B is disposed in the corresponding space 158A, 158B with play (e.g., in the Z-direction). As such, (i) the engagement surface 256A, 256B of the latching nose 252A, 252B may be and/or may come into contact with one or more of the corresponding projections 154A, 154B and/or (ii) the latching nose 252A, 252B may be and/or may come into contact with the corresponding shoulder 156A, 156B. The play of the latching noses 252A, 252B within the spaces 158A, 158B allows the flat cable 20 and the retention member 200 to move relative to the base 100 to a limited extent. This, in turn, allows the cable retainer 10 to be used with a variety of different flat cables 20 having different thicknesses (e.g., in the Z-direction) and/or to connect to several flat cables 20 (e.g., arranged in a stack) simultaneously. It may also facilitate installation and/or use of the cable retainer 10 (e.g., connecting the cable retainer 10 to the second object 40). In other embodiments, one or more latching nose 252A, 252B (e.g., each latching nose 252A, 252B) is disposed in contact with one or more of the corresponding projections 154A, 154B (e.g., via the engagement surface 256A, 256B) and/or with the corresponding shoulder 156A, 156B (e.g., via the sloped surface 254A, 254B) such that latching nose 252A, 252B is disposed in the corresponding space 158A, 158B without play (e.g., in the Z-direction).

As generally illustrated in FIGS. 3-8 and 9C-9E, when in the assembled configuration, the retention member 200 is disposed on and connected to the securing protrusion 150 of the base 100 (e.g., via engagement of the internal connection formation 250 and the securing protrusion 150 and/or the projections 154A, 154B thereof). The securing protrusion 150 is disposed and/or received in the receptacle 220 of the retention member 200 and projects into the slots 242A, 242B. In at least some instances and/or examples, at least a portion of one or more of the shoulders 156A, 156B is also disposed and/or received in receptacle 220. The positioning body 240 is disposed in the notch 152. The retention member openings 230A, 230B and the securing protrusion opening 160 are at least partially aligned with one another in the Y-direction to define and/or form the common passage 12. The internal connection formation 250 is engaged with the securing protrusion 150. For example, (i) the first latching nose 252A is disposed in the first space 158A and may engage one or more first projections 154A and/or the first shoulder 156A, and (ii) the second latching nose 252B is disposed in the second space 158B and may engage one or more second projections 154B and/or the second shoulder 156B.

As generally illustrated in FIGS. 5-9E, the flat cable 20 is flexible and includes one or more electrical conductors overmolded and/or embedded within an insulating material that electrically insulates the conductors from each other and/or from other components. The conductors may be disposed substantially parallel with each other and/or may be substantially aligned with a common plane (e.g., an X-Y plane). The flat cable 20 also includes one or more recesses 22. The recess 22 is disposed in and/or defined by the insulating material, such as between adjacent conductors. The recess 22 has a generally rectangular shape, but may alternatively have a circular, polygonal, or oblong shape, among others. The recess 22 has a length and a width corresponding to a length and a width of the securing protrusion 150, respectively. For example, the length of the recess 22 (e.g., extending generally in the X-direction) may be substantially equal to or slightly smaller than the length of the securing protrusion 150 (e.g., at or about the shoulders 156A, 156B). Similarly, the width of the recess 22 (e.g., extending generally in the Y-direction) may be substantially equal to or slightly smaller than the width of the securing protrusion 150. In some configurations, the corresponding lengths and widths of the recess 22 and the securing protrusion 150 provide an interference fit between the flat cable 20 and the securing protrusion 150 enabling the base 100 and the flat cable 20 to be connected without the retention member 200 (e.g., when the cable retainer 10 is in the unassembled configuration). The length and the width of the recess 22 are also smaller than a length and width of at least a portion of the retention member 200 (e.g., at or about the first end 220A of the receptacle 220), respectively, which restricts and/or prevents the retention member 200 from passing completely through the recess 22.

The flat cable 20 may be connected to the cable retainer 10 in the unassembled configuration and/or in the assembled configuration. When the cable retainer 10 is in the unassembled configuration, the flat cable 20 and the base 100 may be connected via the interference fit of the securing protrusion 150 in the recess 22 of the flat cable 20. When the cable retainer 10 is in the assembled configuration and is connected to the flat cable 20, as generally illustrated in FIGS. 5-8 and 9C-9E, the flat cable 20 and/or a portion thereof is disposed and/or sandwiched between the retention member 200 (e.g., one or more walls 212A-212D thereof) and the base 100 (e.g., the platform 110 and/or the flange 120 thereof) generally in the Z-direction. The securing protrusion 150 is disposed partially in the recess 22 of the flat cable 20 and partially in the receptacle 220 of the retention member 200. The flat cable 20 may contact, may be disposed on, and/or may be supported by the retention member 200 (e.g., one or more walls 212A-212D) and/or the base 100 (e.g., the support surface 112, the platform 110, and/or the flange 120). The arrangement of the flat cable 20 between the retention member 200 and the base 100 restricts and/or effectively prevents the securing protrusion 150 from being removed from the recess 22 of the flat cable 20 (e.g., due to the retention member 200, the platform 110, and/or the flange 120 being too large to pass through the recess of the flat cable 20) thereby further connecting and/or locking the cable retainer 10 and the flat cable 20 to one another.

As generally illustrated in FIGS. 5-9E, the first object 30 is a wire and/or wire bundle of one or more vehicle subsystems, such as an airbag system and/or an infotainment system. While the first object 30 is round (e.g., a round wire and/or a round wire bundle) in FIGS. 5-9E, the first object 30 may have other suitable shapes (e.g., generally rectangular and/or polygonal) in other embodiments. In other embodiments, the first object 30 may be and/or include other components such as a tube, a pipe, a bar, a beam, and other similar components for example. The first object 30 is connectable to the cable retainer 10 via one or more connectors 50. The connector 50 is configured as a tie strap (e.g., a zip-tie) including a tail 52 and a head 54. The head 54 is disposed at and connected to a first longitudinal end of the tail 52. A free end of the tail 52 (e.g., a second longitudinal end of the tail 52 opposite the first longitudinal end and/or the head 54) is insertable into a through hole 56 of the head 54. The tail 52 includes teeth, serrations, and/or other similar formations that engage a claw of the head 54 to connect the tail 52 to the head 54 and restrict and/or prevent removal of the tail 52 from the through hole 56 of the head 54. Alternatively, the connector 50 may be another suitable type of connector 50 (e.g., a twist-tie, string, clip, fastener). For example, in another embodiment the connector 50 is structured as a fastener 130 (e.g., a Christmas tree fastener, detent pin, snap lock pin, push-in rivet) that engages the common passage 12 of the cable retainer 10 and a mounting tab of the first object 30 to secure the mounting tab between the retention member 200 and a portion of the fastener 130.

As generally illustrated in FIGS. 5-8 and 9D-9E, when the cable retainer 10 is in the assembled configuration and is connected to the first object 30, the connector 50 is engaged with the cable retainer 10 and with the first object 30 thereby connecting the cable retainer 10 and the first object 30 to one another. The first object 30 is disposed on and/or adjacent to the retention member 200. In examples, the first object 30 is disposed at or about the second end 220B of the receptacle 220 and may substantially cover the first slot 242A, the second slot 242B, and/or the positioning body 240. The connector 50 is wrapped at least partially around the first object 30. The connector 50 also extends through and is at least partially disposed in the common passage 12 of the cable retainer 10 (e.g., the securing protrusion opening 160, the retention member openings 230A, 230B, and the receptacle 220). The tail 52 of the connector 50 (e.g., at or about the free end) is connected to the head 54 of the connector 50 via the teeth and the claw such that the connector 50 forms a loop around the first object 30 and a portion of the cable retainer 10 (e.g., a portion of the base 100 and a portion of the retention member 200). Conceivably, the first object 30 may also be connected to the base 100 and/or to the retention member 200 when the cable retainer 10 is in the unassembled configuration.

The second object 40 may be and/or include a surface, a portion, and/or a component of a vehicle, such as vehicle floor, a vehicle ceiling, and/or a vehicle panel, and/or may include a non-vehicle component, among others. As generally illustrated in FIGS. 5-9E, the second object 40 is configured as a bracket or mount. The second object 40 includes one or more recesses 42 and/or depressions for receiving the fastener 130 of the cable retainer 10. The recess 42 has a generally circular shape, but may alternatively have an oval, polygonal, or oblong shape, among others.

The second object 40 may be connected to the cable retainer 10 in the unassembled configuration and/or in the assembled configuration. As generally illustrated in FIGS. 5-8 and 9E, when the cable retainer 10 is connected to the second object 40, the fastener 130 of the base 100 is disposed in the recess 42 of the second object 40. One or more of the engagement projections 132 of the fastener 130 engage the second object 40 (e.g., contact a surface of the second object 40 facing away from the flange 120) securing and/or connecting the base 100 and/or the cable retainer 10 to the second object 40. The second, wider end 120B of the flange 120 presses against the second object 40 (e.g., a surface of the second object 40 facing the flange 120) and biases one or more of the engagement projections 132 of the fastener 130 against the second object 40. This restricts and/or limits relative movement between the base 100 and the second object 40, which may limit, reduce, and/or prevent noise generation (e.g., rattling).

A method of assembling the cable retainer 10 and/or of connecting a plurality of objects (e.g., objects 20, 30, 40) to one another with the cable retainer 10 is generally illustrated in FIGS. 9A-9E. The method includes connecting the flat cable 20 and the cable retainer 10 (see, e.g., FIGS. 9A and 9B), connecting the first object 30 and the cable retainer 10 (see, e.g., FIG. 9C), and/or connecting the second object 40 and the cable retainer 10 (see, e.g., FIG. 9D) to connect the flat cable 20, the first object 30, and the second object 40 to one another (see, e.g., FIGS. 5-8 and 9E).

Figure 9A:
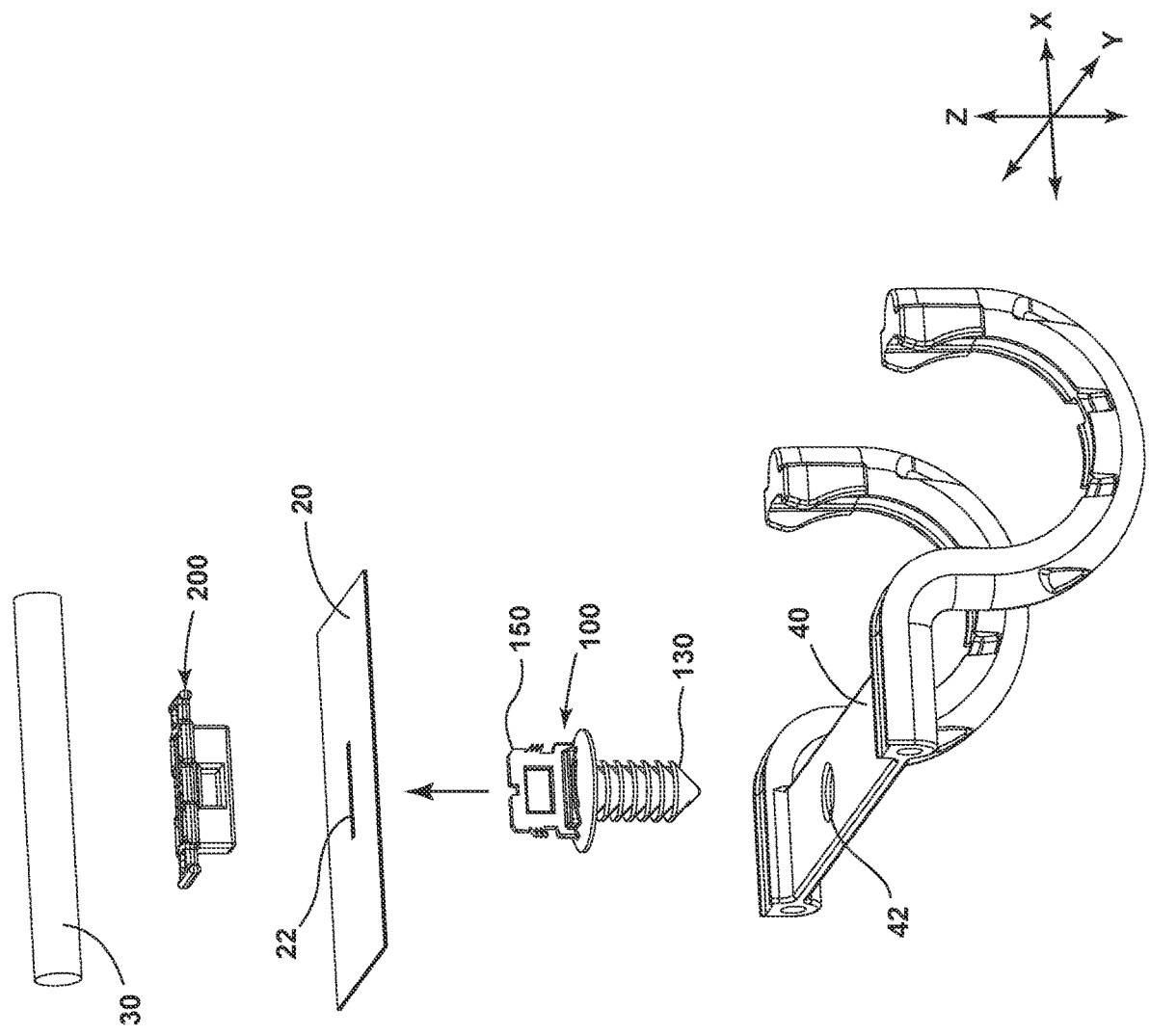
FIGS. 9A through 9E are perspective views generally illustrating an embodiment of a method of connecting a flat flexible cable, a first object, and a second object with a cable retainer according to teachings of the present disclosure.
Figure 9B:
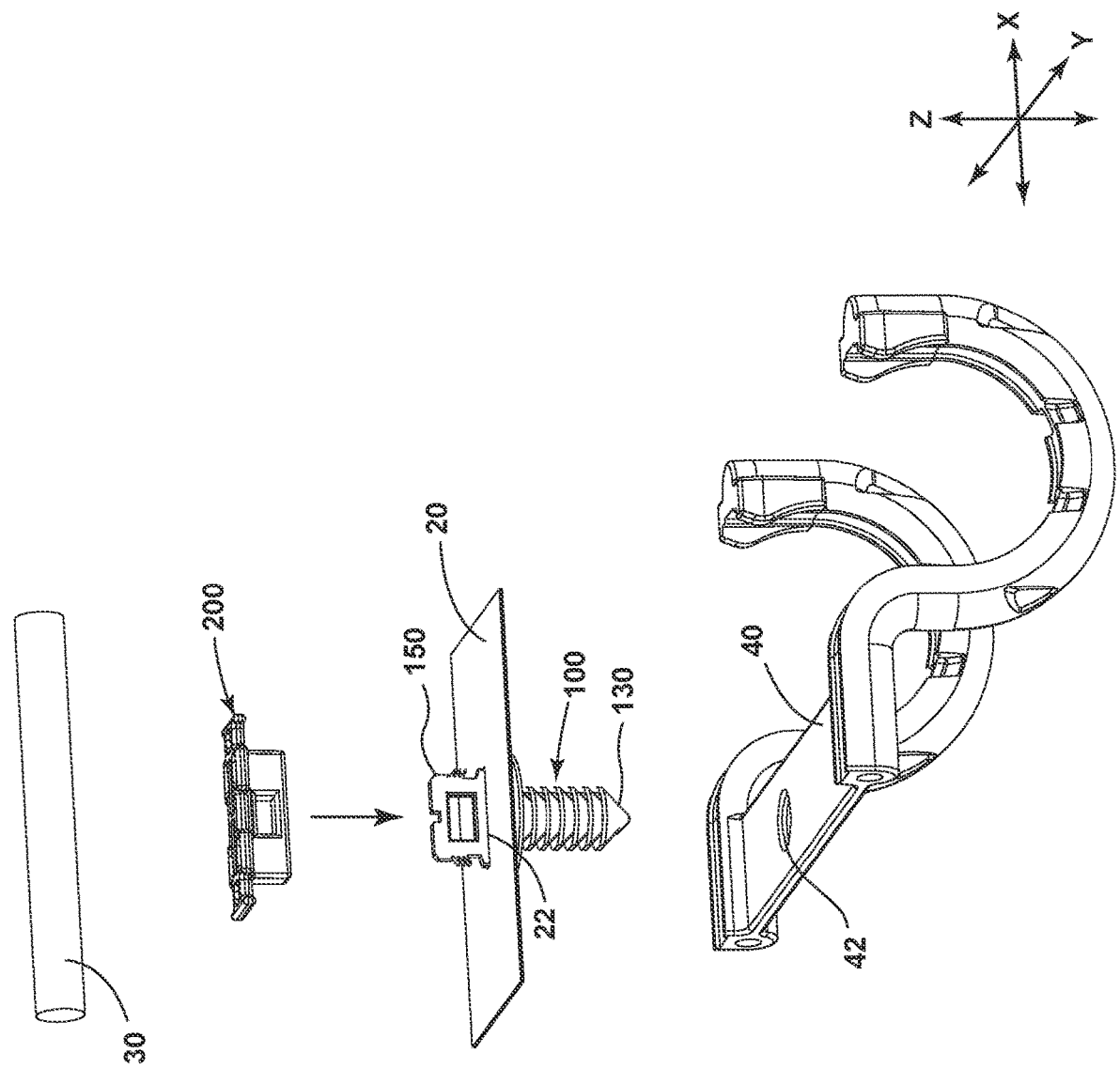

As generally illustrated in FIGS. 9A and 9B, connecting the flat cable 20 and the cable retainer 10 includes disposing the securing protrusion 150 through a portion of the flat cable 20, such as by inserting the securing protrusion 150 of the base 100 into the recess 22 of the flat cable 20, to connect the base 100 and the flat cable 20 (see, e.g., FIG. 9A). This may include establishing an interference fit of the securing protrusion 150 in the recess 22 and/or disposing the flat cable 20 on the support surface 112 of the platform 110. After inserting the securing protrusion 150 into the recess 22, the cable retainer 10 may be adjusted to the assembled configuration (see, e.g., FIGS. 3 and 4) via connecting the base 100 and the retention member 200 (see, e.g., FIG. 9B), which secures the flat cable 20 between the base 100 and the retention member 200. Connecting the base 100 and the retention member 200 includes connecting the securing protrusion 150 with one or more walls 212A-212D of the retention member 200. Additionally, in at least some embodiments, connecting the base 100 and the retention member 200 and/or connecting the securing protrusion 150 with one or more walls 212A-212D includes inserting the securing protrusion 150 into the receptacle 220 and engaging the securing protrusion 150 with the internal connection formation 250. Connecting the base 100 and the retention member 200 and/or inserting the securing protrusion 150 into the receptacle 220 includes positioning the base 100 and the retention member 200 to define and/or form the common passage 12 via at least partially aligning the securing protrusion opening 160 and the retention member openings 230A, 230B. The internal connection formation 250 (e.g., the latching noses 252A, 252B) may deflect, flex, and/or temporarily deform one or more of the projections 154A, 154B when inserting the securing protrusion 150 into the receptacle 220. Additionally, engaging the securing protrusion 150 with the internal connection formation 250 may include inserting the latching noses 252A, 252B into the corresponding spaces 158A, 158B of the securing protrusion 150 to engage (e.g., contact) one or more corresponding projections 154A, 154B and/or the corresponding shoulder 156A, 156B.

Figure 9C:
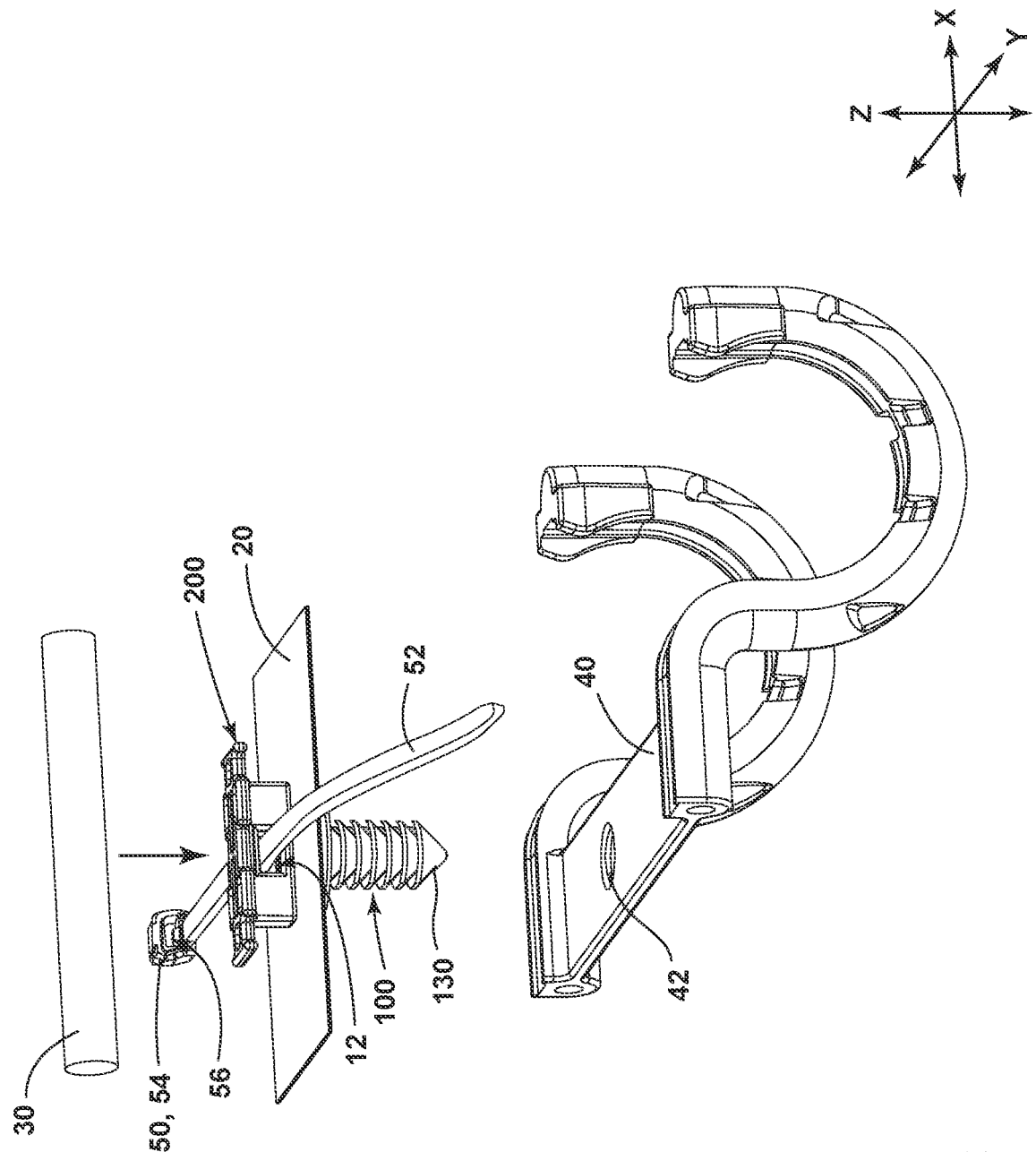

As generally illustrated in FIG. 9C, connecting the first object 30 and the cable retainer 10 may include positioning the first object 30 relative to the cable retainer 10 such that the first object 30 is disposed at or about the second end 220B of the receptacle 220 and/or the positioning body 240 of the retention member 200. Connecting the first object 30 and the cable retainer 10 includes (e.g., after positioning the first object 30 relative to the retention member 200) engaging the connector 50 with the first object 30 and with the cable retainer 10. This, in turn, includes passing the tail 52 of the connector 50 (e.g., the free end of the tail 52) through the securing protrusion opening 160, the retention member openings 230A, 230B, the receptacle 220, and/or the common passage 12 of the cable retainer 10, wrapping the connector 50 around at least a portion of the first object 30, and connecting the tail 52 of the connector 50 to the head 54 of the connector 50 (e.g., via inserting the free end of the tail 52 into the through hole 56 and engaging the teeth of the tail 52 with the claw of the head 54) such that the connector 50 forms a loop around at least a portion of the first object 30 and a portion of the cable retainer 10 (e.g., a portion of the securing protrusion 150 and a portion of one or more walls 212A, 212B). Subsequently, relative movement (e.g., play) between the first object 30 and the cable retainer 10 may be reduced, restricted, limited, and/or eliminated (e.g., via manipulating the connector 50, the first object 30, and/or the cable retainer 10 to tighten the looped connector 50 around the first object 30 and the cable retainer 10) to, for example, limit and/or prevent noise generation. Generally, the first object 30 and the cable retainer 10 are connected after the flat cable 20 and the cable retainer 10 have been connected (e.g., after the cable retainer 10 is in the assembled configuration) to, for example, connect the first object 30 and the flat cable 20 together.

Figure 9D:
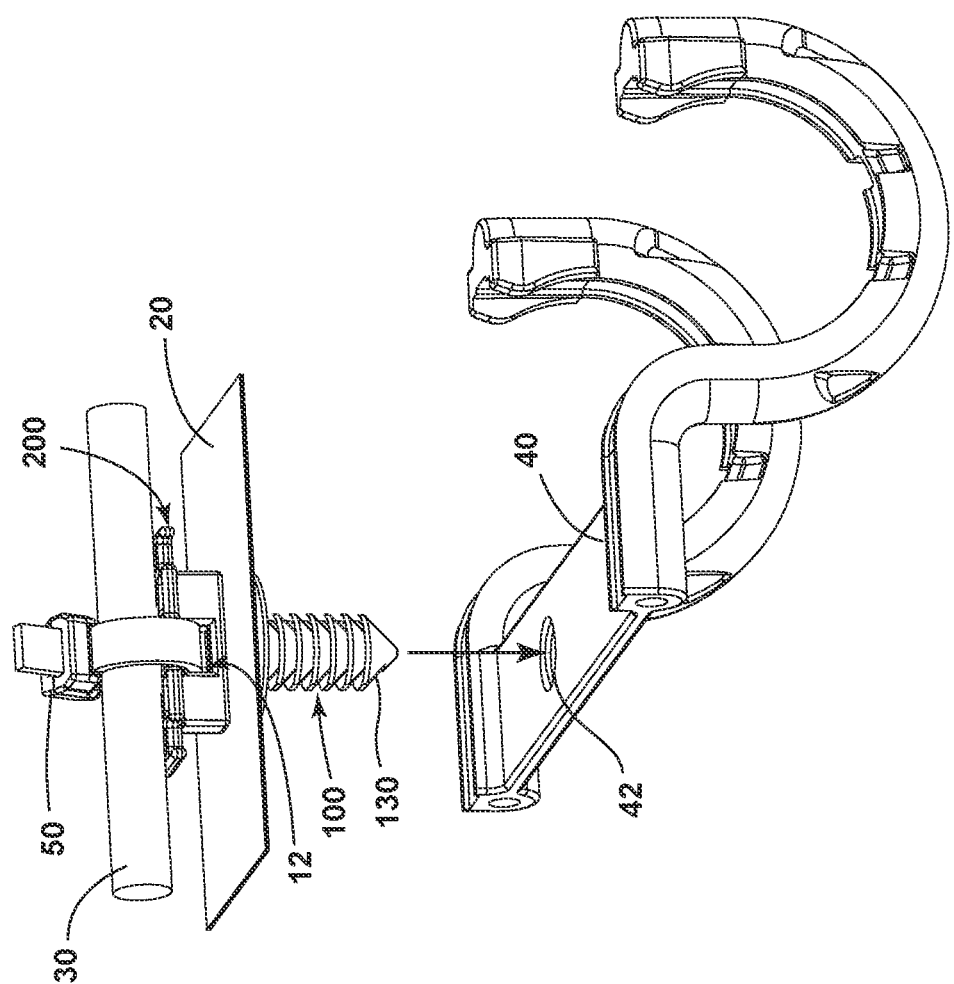
Figure 9E:
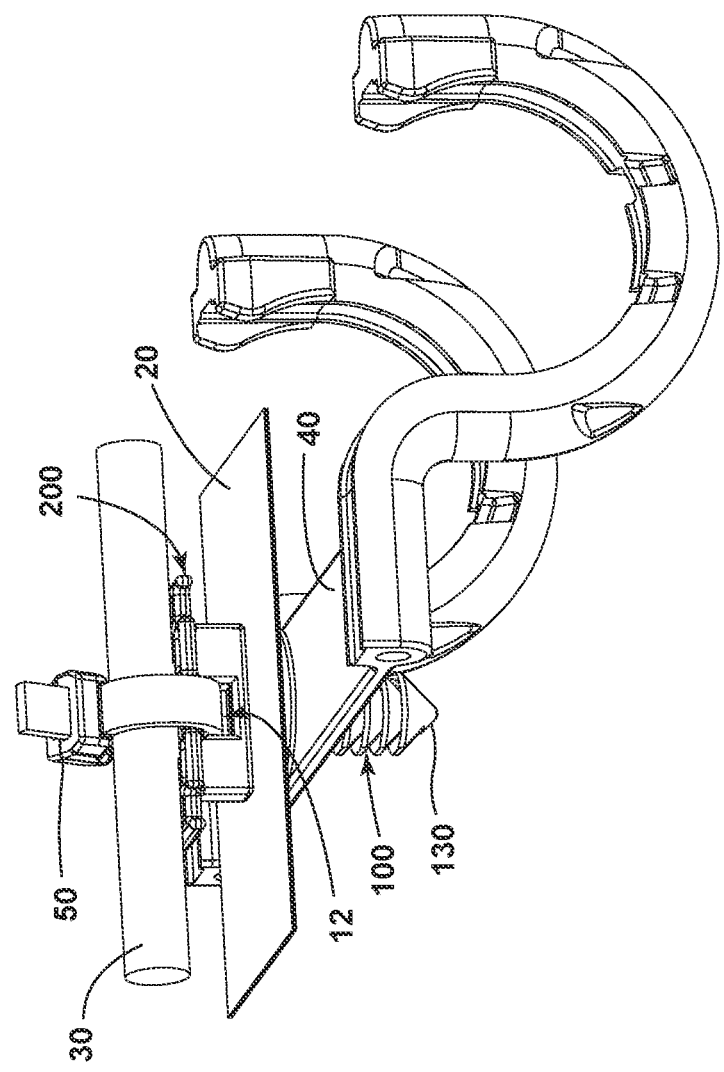
Figure 9E:
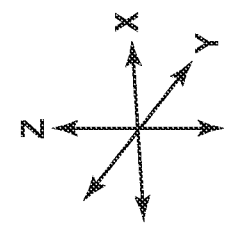

As generally illustrated in FIG. 9D, connecting the second object 40 and the cable retainer 10 includes engaging the fastener 130 of the cable retainer 10 with the second object 40. This includes adjusting, moving, and/or pressing the fastener 130 into the recess 42 of the second object 40 such that one or more engagement projections 132 of the fastener 130 engage the second object 40 (e.g., contact a surface of the second object 40 facing away from the flange 120), which connects the base 100, the cable retainer 10, and/or one or more components connected thereto (e.g., the flat cable 20 and/or the first object 30) to the second object 40. Connecting the second object 40 and the cable retainer 10 may also include biasing one or more of the engagement projections 132 against the second object 40 via the flange 120 pressing against the second object 40 (e.g., a surface of the second object 40 facing the flange 120). Generally, the second object 40 and the cable retainer 10 are connected after the cable retainer 10, the flat cable 20, and the first object 30 have been connected to one another to, for example, connect the flat cable 20 and the first object 30 to the second object 40. However, the second object 40 and the base 100 and/or the cable retainer 10 may be connected before connecting the flat cable 20 and the cable retainer 10 and/or before connecting the first object 30 and the cable retainer 10.

The disclosure includes, without limitation, the following embodiments:

1. A cable retainer for connecting a flat cable, a first object, and/or a second object to one another, the cable retainer comprising a base and a retention member, wherein: the base includes: a platform; a fastener extending from the platform, the fastener engageable with said second object; a securing protrusion extending from the platform, the securing protrusion disposable through a portion of said flat cable; and a securing protrusion opening disposed in the securing protrusion; the retention member includes: a wall to which the securing protrusion is connectable to secure said flat cable between the platform and the retention member; and a retention member opening; and when in an assembled configuration, the securing protrusion opening of the securing protrusion and the retention member opening of the retention member are at least partially aligned with one another and define a common passage to receive a connector to connect said first object to the base and the retention member.

2. The cable retainer of embodiment 1, wherein: said first object is at least one of a wire and a wire bundle; said second object is at least one of a bracket and a panel; and said connector is a tie strap.

3. The cable retainer according to any of the preceding embodiments, wherein: the securing protrusion is substantially planar and extends from the platform in a first direction; the securing protrusion opening extends through the securing protrusion in a second direction; the securing protrusion includes at least one projection engageable with the retention member, the at least one projection extending from the securing protrusion in a third direction; and the first direction, the second direction, and the third direction extend transversely to one another.

4. The cable retainer according to any of the preceding embodiments, wherein: the securing protrusion includes a plurality of first projections and a plurality of second projections engageable with the retention member; the plurality of first projections and the plurality of second projections are disposed on opposite sides of the securing protrusion and extend from the securing protrusion in opposite directions; and the securing protrusion opening is disposed in the securing protrusion between the plurality of first projections and the plurality of second projections.

5. The cable retainer according to any of the preceding embodiments, wherein: a free end of the securing protrusion includes a notch; the retention member includes a positioning body; and when in the assembled configuration, the positioning body is disposed in the notch and restricts movement of the securing protrusion relative to the wall.

6. The cable retainer according to any of the preceding embodiments, wherein: the retention member includes a receptacle into which the securing protrusion is insertable; the receptacle is at least partially defined by the wall of the retention member; and when in the assembled configuration, the securing protrusion of the base is disposed at least partially in the receptacle of the retention member (i) securing said flat cable between the platform and the retention member and (ii) at least partially aligning the securing protrusion opening of the securing protrusion and the retention member opening of the retention member.

7. The cable retainer according to any of the preceding embodiments, wherein: the retention member includes an internal connection formation disposed within the receptacle, the internal connection formation engageable with the securing protrusion to resist removal of the securing protrusion from the receptacle; and when in the assembled configuration, the internal connection formation of the retention member is engaged with the securing protrusion of the base connecting the retention member and the base.

8. The cable retainer according to any of the preceding embodiments, wherein: the internal connection formation includes at least one latching nose; the securing protrusion includes: at least one projection engageable with the internal connection formation; and at least one shoulder disposed between the at least one projection and the platform; and when in the assembled configuration, the at least one latching nose is disposed between the at least one projection and the at least one shoulder.

9. The cable retainer according to any of the preceding embodiments, wherein, when in the assembled configuration, at least a portion of the at least one shoulder is disposed in the receptacle.

10. The cable retainer according to any of the preceding embodiments, wherein: a free end of the securing protrusion includes a notch; the retention member includes a positioning body extending across and at least partially closing an end of the receptacle to define a first slot and a second slot; and when in the assembled configuration, the positioning body is disposed in the notch and the securing protrusion is disposed at least partially within the first slot and the second slot restricting movement of the securing protrusion within the receptacle.

11. The cable retainer according to any of the preceding embodiments, wherein the base includes a flange extending around the fastener.

12. A method of connecting a plurality of objects to one another with the cable retainer according to any of the preceding embodiments, comprising: connecting the flat cable and the cable retainer via inserting the securing protrusion of the base through a portion of the flat cable and subsequently connecting the base and the retention member to one another; connecting the first object and the cable retainer via engaging the connector with the first object and with the cable retainer; and connecting the second object and the cable retainer via engaging the fastener of the cable retainer with the second object.

13. The method according to any of the preceding embodiments, wherein: the retention member includes: a receptacle into which the securing protrusion is insertable; and an internal connection formation disposed within the receptacle; the receptacle is at least partially defined by the wall of the retention member; and connecting the base and the retention member to one another includes inserting the securing protrusion into the receptacle and engaging the securing protrusion with the internal connection formation.

14. The method according to any of the preceding embodiments, wherein connecting the base and the retention member to one another includes securing the flat cable between the platform of the base and the retention member.

15. The method according to any of the preceding embodiments, wherein connecting the base and the retention member to one another includes at least partially aligning the securing protrusion opening of the base and the retention member opening of the retention member to form the common passage.

16. The method according to any of the preceding embodiments, wherein engaging the fastener of the cable retainer with the second object includes adjusting the fastener into a recess of the second object.

17. The method according to any of the preceding embodiments, wherein the second object is at least one of a bracket and a panel.

18. The method according to any of the preceding embodiments, wherein: the connector is a tie strap; and engaging the connector with the first object and with the cable retainer includes passing a tail of the tie strap through the common passage of the cable retainer, wrapping the tie strap around the first object, and connecting the tail of the tie strap to a head of the tie strap.

19. The method according to any of the preceding embodiments, wherein the first object is at least one of a wire and a wire bundle.

20. The method according to any of the preceding embodiments, wherein: engaging the fastener of the cable retainer with the second object includes pressing the fastener into a recess of the second object; and the second object is at least one of a bracket and a panel.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element. without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A cable retainer for connecting a flat cable, a first object, and/or a second object to one another, the cable retainer comprising a base and a retention member, wherein:
   the base includes:
      a platform;
      a fastener extending from the platform, the fastener engageable with said second object;
      a securing protrusion extending from the platform, the securing protrusion disposable through a portion of said flat cable; and
      a securing protrusion opening disposed in the securing protrusion;
   the retention member includes:
      a wall to which the securing protrusion is connectable to secure said flat cable between the platform and the retention member; and
      a retention member opening; and
   when in an assembled configuration, the securing protrusion opening of the securing protrusion and the retention member opening of the retention member are at least partially aligned with one another and define a common passage to receive a connector to connect said first object to the base and the retention member.

2. The cable retainer of claim 1, wherein:
   said first object is at least one of a wire and a wire bundle;
   said second object is at least one of a bracket and a panel; and
   said connector is a tie strap.

3. The cable retainer of claim 1, wherein:
   the securing protrusion is substantially planar and extends from the platform in a first direction;
   the securing protrusion opening extends through the securing protrusion in a second direction;
   the securing protrusion includes at least one projection engageable with the retention member, the at least one projection extending from the securing protrusion in a third direction; and
   the first direction, the second direction, and the third direction extend transversely to one another.

4. The cable retainer of claim 1, wherein:
   the securing protrusion includes a plurality of first projections and a plurality of second projections engageable with the retention member;
   the plurality of first projections and the plurality of second projections are disposed on opposite sides of the securing protrusion and extend from the securing protrusion in opposite directions; and
   the securing protrusion opening is disposed in the securing protrusion between the plurality of first projections and the plurality of second projections.

5. The cable retainer of claim 1, wherein:
   a free end of the securing protrusion includes a notch;
   the retention member includes a positioning body; and
   when in the assembled configuration, the positioning body is disposed in the notch and restricts movement of the securing protrusion relative to the wall.

6. The cable retainer of claim 1, wherein:
   the retention member includes a receptacle into which the securing protrusion is insertable;
   the receptacle is at least partially defined by the wall of the retention member; and
   when in the assembled configuration, the securing protrusion of the base is disposed at least partially in the receptacle of the retention member (i) securing said flat cable between the platform and the retention member and (ii) at least partially aligning the securing protrusion opening of the securing protrusion and the retention member opening of the retention member.

7. The cable retainer of claim 6, wherein:
   the retention member includes an internal connection formation disposed within the receptacle, the internal connection formation engageable with the securing protrusion to resist removal of the securing protrusion from the receptacle; and
   when in the assembled configuration, the internal connection formation of the retention member is engaged with the securing protrusion of the base connecting the retention member and the base.

8. The cable retainer of claim 7, wherein:
   the internal connection formation includes at least one latching nose;
   the securing protrusion includes:
      at least one projection engageable with the internal connection formation; and
      at least one shoulder disposed between the at least one projection and the platform; and
   when in the assembled configuration, the at least one latching nose is disposed between the at least one projection and the at least one shoulder.

9. The cable retainer of claim 8, wherein, when in the assembled configuration, at least a portion of the at least one shoulder is disposed in the receptacle.

10. The cable retainer of claim 6, wherein:
    a free end of the securing protrusion includes a notch;
    the retention member includes a positioning body extending across and at least partially closing an end of the receptacle to define a first slot and a second slot; and
    when in the assembled configuration, the positioning body is disposed in the notch and the securing protrusion is disposed at least partially within the first slot and the second slot restricting movement of the securing protrusion within the receptacle.

11. The cable retainer of claim 1, wherein the base includes a flange extending around the fastener.

12. A method of connecting a plurality of objects to one another with the cable retainer of claim 1, comprising:
    connecting the flat cable and the cable retainer via inserting the securing protrusion of the base through a portion of the flat cable and subsequently connecting the base and the retention member to one another;
    connecting the first object and the cable retainer via engaging the connector with the first object and with the cable retainer; and
    connecting the second object and the cable retainer via engaging the fastener of the cable retainer with the second object.

13. The method of claim 12, wherein:
    the retention member includes:
       a receptacle into which the securing protrusion is insertable; and
       an internal connection formation disposed within the receptacle;

the receptacle is at least partially defined by the wall of the retention member; and connecting the base and the retention member to one another includes inserting the securing protrusion into the receptacle and engaging the securing protrusion with the internal connection formation.

14. The method of claim 12, wherein connecting the base and the retention member to one another includes securing the flat cable between the platform of the base and the retention member.

15. The method of claim 12, wherein connecting the base and the retention member to one another includes at least partially aligning the securing protrusion opening of the base and the retention member opening of the retention member to form the common passage.

16. The method of claim 12, wherein engaging the fastener of the cable retainer with the second object includes adjusting the fastener into a recess of the second object.

17. The method of claim 16, wherein the second object is at least one of a bracket and a panel.

18. The method of claim 12, wherein:

the connector is a tie strap; and engaging the connector with the first object and with the cable retainer includes passing a tail of the tie strap through the common passage of the cable retainer, wrapping the tie strap around the first object, and connecting the tail of the tie strap to a head of the tie strap.

19. The method of claim 18, wherein the first object is at least one of a wire and a wire bundle.

20. The method of claim 19, wherein:

engaging the fastener of the cable retainer with the second object includes pressing the fastener into a recess of the second object; and the second object is at least one of a bracket and a panel.

* * * * *